Aug. 18, 1959  C. J. MUNTER  2,899,971

FEEDING DEVICES

Filed Sept. 10, 1954

INVENTOR
Casimir J. Munter

United States Patent Office 2,899,971
Patented Aug. 18, 1959

2,899,971

FEEDING DEVICES

Casimir J. Munter, Upper St. Clair Township, Allegheny County, Pa., assignor, by mesne assignments, to Hagan Chemicals & Controls, Inc., a corporation of Pennsylvania Application September 10, 1954, Serial No. 455,337

7 Claims. (Cl. 137—216)

This invention relates to feeding mechanisms and particularly to a feeder for introducing additive solution to a flowing liquid, with particular reference to use in household laundry and the like applications. There has long been a need for a simple, inexpensive device capable of adding a regulated amount of an additive solution to a liquid, particularly water for household purposes. For example, there has long been a demand for a device which would satisfactorily meter liquid water softener and the like to a water line delivering water to the ordinary household washing machine so that it would be unnecessary for the housewife to measure and handle a given amount of the additive material at various stages in the washing operation. No satisfactory simple feeder capable of accomplishing this purpose has been available although the problem has long been recognized and there has been a constant demand for such a device. The chemical feeders used in commercial operations are too complex and cumbersome as well as too expensive for household use and in general fail to provide a uniform feed with changing water pressures. A feeder for additive solution must, in order to be successful, accomplish several things. It must be capable of proportioning the additive solution to the flowing stream of water regardless of pressure variations. It must also provide protection for the water line in the event that the water pressure drops or for some reason there is a vacuum in the water line which would tend to draw back the additive solution. The device must also be simple and uncomplicated by moving parts as well as cheap to manufacture and install.

I have invented a feeder device which successfully introduces additive solution to a liquid flowing in a conductor and which fits all of the requirements outlined above. It is simple and uncomplicated by moving parts. It provides protection against drawing back the additive solution into the main water line and it is cheap to make and to install.

Preferably I provide a feeder having an elongated hollow member with an entrance and a discharge end. Flow velocity changing means are provided at the entrance to the hollow member receiving the liquid from the conductor. Atmospheric connections are provided in the flow velocity changing means adjacent the inlet end whereby air may be drawn into the hollow member. An elongated mixing chamber is provided at the discharging end of the hollow member receiving liquid from the flow velocity changing means, said mixing chamber being of larger cross-sectional area than the flow velocity changing means. An inlet means is connected to the mixing chamber adjacent its connection with the flow velocity changing means, said inlet means being connected to a source of additive solution whereby the additive solution is constantly added to the liquid at a regular rate.

Preferably the flow velocity changing means is a cylindrical passage discharging immediately into the mixing chamber which is again a cylindrical passage of larger cross-sectional area than the flow velocity changing means. Preferably the atmospheric connections to the flow velocity changing means are a series of small holes through the wall of the hollow member connecting into the flow velocity changing means adjacent its inlet end.

The ratio of the cross-sectional area of adjacent sections to the length of the next succeeding section in both the flow velocity changing means and the mixing chamber is important. It is necessary that the outlet end of any given section be full of liquid in order to obtain maximum efficiency. If the mixing chamber is too large it will become ineffective to draw additive material into the mixing chamber.

In the foregoing statement I have attempted to point out certain salient features, objects and advantages of my invention. Other features, objects and advantages will become apparent from a consideration of the following description and the accompanying drawings in which—

Figure 4:
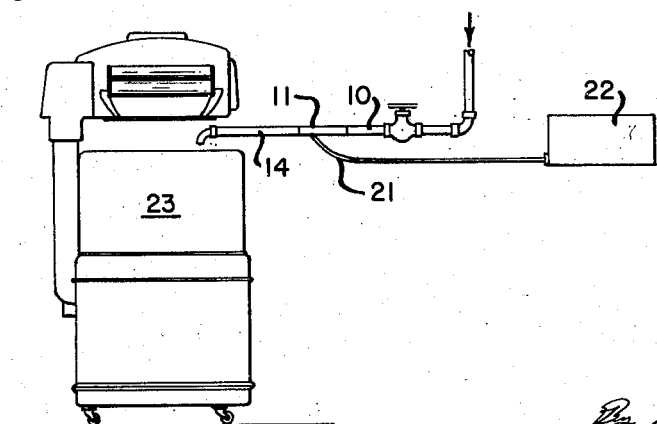
Figure 4 is a diagrammatical showing of a feeder according to my invention applied in a household laundry system.

Referring to the drawings I have illustrated a liquid supply line 10 into which is inserted an elongated hollow member 11 forming the body of the feeder of my invention. The hollow member 11 is provided with an entrance end 12 and a discharge end 13 connected to a liquid supply line or fitting 14 for delivering liquid to the point of ultimate use. A hollow cylindrical bore 15 of reduced cross section is provided at the entrance end of the hollow elongated member to act as a flow velocity changing means. Connected to the hollow bore 15 is a second hollow bore 16 of slightly larger cross-sectional area. The bore 15 discharges directly into the bore 16 over the square shoulders 17. A series of small openings 18 are provided at the entrance end of the intermediate bore 16. These openings 18 connect directly to the atmosphere. A mixing chamber 19 is provided at the discharge end of the elongated member 11. The mixing chamber 19 is a hollow bore of slightly larger cross section than the intermediate bore 16 and receives the liquid from the bore 16 over the shoulder 20. An inlet line 21 connected to a source of additive solution discharges into the mixing chamber 19 adjacent its connection with the intermediate bore 16. In operation the feeder is inserted in the liquid line 10 as shown in Figure 4 and the inlet line 21 is connected to a source of additive 22 such as a solution of "Calgon" (the trademark of Calgon, Inc., for its brand of molecularly dehydrated metaphosphate). As water is delivered through the line 10 into a washing machine 23 it enters the flow velocity changing bore 15 where its velocity is increased. It then discharges over the shoulder 17 into the intermediate bore 16 creating a vacuum adjacent the shoulder 17 and the inlet openings 18 tending to bring in a small amount of air through the inlet openings 18. Passing through the intermediate bore 16 into the mixing chamber 19, an additional vacuum is created adjacent the shoulder 20 which draws in a regular amount of the additive solution through the inlet opening 21 for any given velocity of liquid. The water and "Calgon" solution are discharged from the mixing chamber 19 into the line 14 from which it is delivered into the washing machine 23. In the event that the water supply in the line 10 is cut off the feed from the inlet 21 will stop and water in the line 14 and mixing chamber 19 will be prevented from passing into the line 10 by the passage of air from the inlet openings 18 which break the vacuum in the line and prevent the drawback of additive and water into the main line 10.

Figure 1:
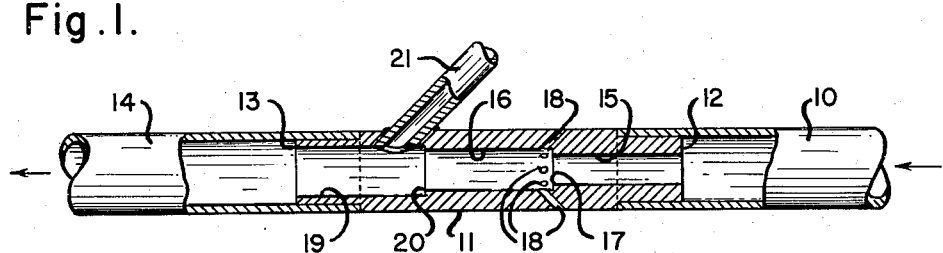
Figure 1 is a longitudinal section of a preferred form of feeder according to my invention.
Figure 2:
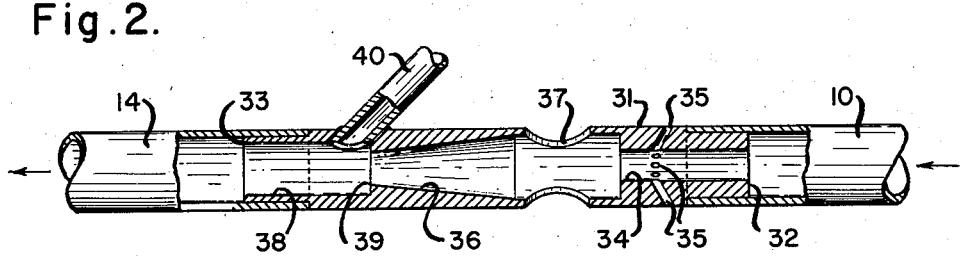
Figure 2 is a longitudinal cross-sectional view of a second embodiment of a feeder according to my invention.

I have illustrated a second embodiment of my invention in Figure 2. In Figure 2 I show an elongated body 31 forming the housing for the feeder having an entrance end 32 and a discharge end 33. An inlet bore 34 of reduced cross-sectional area receives the liquid from the main line 10 in a manner similar to that of the feeder of Figure 1. Adjacent the inlet end 32 there are provided small openings 35 connected to the atmosphere. The bore 34 discharges into the frusto-conical intermediate bore 36 which is provided adjacent its entry end with air gaps 37 opening into the atmosphere. A liquid passing through the bore 36 enters a mixing chamber 38 at the discharge end of the hollow member 31. The mixing chamber 38 has a cross-sectional area greater than the area of the discharge end of the intermediate bore 36 formed by the shoulders 39. An inlet line 40 is connected to the mixing chamber adjacent its inlet end and receives additive fluid from a source of additive solution not shown. The operation of the embodiment shown in Figure 2 is very similar to that of Figure 1. The liquid entering from the main line 10 passes through the bore 34 where its velocity is increased. A small amount of air is drawn in through the openings 35 and mixed with the liquid. This air acts as a cushion in the intermediate bore 36 and reduces the criticality otherwise necessary in the proportioning of intermediate bore 36 to the bore 34. As the liquid passes from the bore 36 into the mixing chamber 38 a vacuum is created adjacent the shoulder 39 and a regular amount of additive solution is drawn into the mixing chamber through the inlet line 40 and mixed with the liquid passing into the feed line 14. In the event that the liquid in the line 10 ceases to flow or is drawn back by a failure in the liquid supply, air is drawn in through the air gap openings 37 thereby preventing the drawback of any additive or additive water-mixture from the mixing chamber 38.

Figure 3:
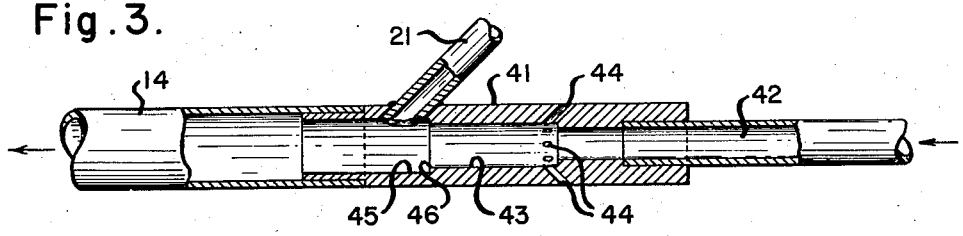
Figure 3 is a longitudinal section of a third embodiment of a feeder according to my invention.

In Figure 3 I have shown still a third embodiment of my invention. Referring to Figure 3 I provide an elongated hollow member 41 forming the body of the feeder of my invention. The liquid supply line 42 is connected into a flow velocity changing bore 43 of slightly larger internal area. A series of small openings 44 are provided adjacent the junction of the flow velocity changing means and the liquid line 42. These openings 44 open directly to the atmosphere. A mixing chamber 45 is provided at the discharge end of the flow velocity changing bore 43 and receives liquid from it over the shoulder 46. An inlet line 21 connected to a source of additive solution discharges into the mixing chamber 45 adjacent its connection with the bore 43. The operation of the feeder illustrated in Figure 3 is essentially the same as that of Figure 1.

Both the feeders of Figures 2 and 3 can be used as shown in Figure 4 and described in connection with the feeder of Figure 1.

While I have illustrated and described certain preferred embodiments of my invention it will be understood that it may be otherwise embodied within the scope of the following claims.

I claim:

1. A feeder for introducing additive solution to a liquid flowing in a conductor comprising an elongated hollow member having an entrance end and a discharge end, said entrance end being adapted to be connected to the conductor, flow velocity changing means at the entrance end of said hollow member receiving liquid from the conductor, a second flow velocity changing means intermediate the ends of the hollow member receiving liquid from the first flow velocity changing means, said second flow velocity changing means having an enlarged cross section at its junction with the first flow velocity changing means whereby a vacuum is created at said junction, atmospheric connections in said second flow velocity changing means adjacent its connection with the first flow velocity changing means whereby air is drawn into the hollow member, an elongated mixing chamber at the discharge end of the hollow member receiving liquid from the second flow velocity changing means, said chamber having an enlarged cross section at its junction with the second flow velocity changing means whereby a vacuum is created adjacent said junction and inlet means connected at one end to the mixing chamber adjacent its junction with the second flow velocity changing means and being adapted to be connected at the opposite end to a source of additive solution, said inlet means lying between the atmospheric connections and the discharge end of the feeder.

2. A feeder for introducing additive solution to a liquid flowing in a conductor comprising an elongated cylindrical member having an inlet end and a discharge end, said inlet end being adapted to be connected to the conductor to receive liquid therefrom, three coaxial cylindrical bores in said member, said bores being successively larger in size from the inlet end to the discharge end of the cylindrical member, atmospheric connections in the second bore adjacent its junction with the smallest bore whereby air may be drawn into said second bore, and inlet means in the largest bore adjacent its junction with the second bore, said inlet means being adapted to be connected to a source of additive solution, said inlet means lying between the atmospheric connections and the discharge end of the feeder.

3. A feeder as claimed in claim 2 wherein the difference in cross-sectional area between each pair of adjacent bores is proportioned to the length of the larger bore of the pair so that the liquid is in contact with the walls of the bore at its discharge end.

4. A feeder as claimed in claim 2 wherein the second bore has a cross-sectional area greater than the cross-sectional area of the first, smallest bore but not substantially greater than the total of the area of said first bore and the atmospheric connections.

5. A feeder for introducing additive solution to a liquid flowing in a conductor comprising an elongated hollow member having an entrance end and a discharge end, flow velocity changing means at the entrance end adapted to be connected to a conductor and receiving liquid therefrom, atmospheric connections in said flow velocity changing means adjacent the entrance end whereby air is drawn into the hollow member, an elongated mixing chamber at the discharge end of the hollow member, receiving liquid from the flow velocity changing means, said chamber having a cross section larger than the flow velocity changing means and inlet means connected to the mixing chamber adjacent its junction with the flow velocity changing means and being adapted to be connected to a source of additive solution.

6. A feeder for metering additive solution to a liquid flowing in a conductor comprising an elongated hollow member having an entrance and a discharge end, flow velocity changing means in the entrance end and adapted to receive liquid from a conductor whereby the velocity of the liquid is increased, atmospheric connections in said flow velocity changing means adjacent the entrance end whereby air is drawn into the liquid stream, an intermediate hollow frusto-conical bore in the hollow member receiving liquid from the flow velocity changing means and discharging it through the tip of the frusto-conical section, air gap means in the wall of the frusto-conical section opening to the atmosphere and an elongated mixing chamber at the discharge end of the hollow member receiving liquid from the conical tip, said mixing chamber having a cross-sectional area greater than the discharge tip of the cone and an inlet means adjacent its junction with said tip and adapted to be connected to a source of additive solution, said inlet means lying between the air gap means and the discharge end of the feeder.

7. A feeder for metering additive solution to a liquid as claimed in claim 6 wherein the discharge opening in the conical tip is substantially equal in cross-sectional area to the cross-sectional area of the flow velocity changing means.

References Cited in the file of this patent
UNITED STATES PATENTS

| | | |
|---|---|---|
| 1,630,543 | Scott | May 31, 1927 |
| 2,039,275 | McGrael | Apr. 28, 1936 |
| 2,161,151 | Freedman | June 6, 1939 |
| 2,183,561 | Hamblin | Dec. 19, 1939 |
| 2,288,247 | Kinstorff | June 30, 1942 |
| 2,295,986 | Boosey | Sept. 15, 1942 |
| 2,331,518 | Trier | Oct. 12, 1943 |
| 2,381,589 | Hayes | Aug. 7, 1945 |
| 2,510,396 | Goodrie | June 6, 1950 |
| 2,540,064 | Weber | Jan. 30, 1951 |
| 2,571,870 | Hayes | Oct. 16, 1951 |
| 2,571,871 | Hayes | Oct. 16, 1951 |
| 2,619,977 | Hagen | Dec. 2, 1952 |
| 2,724,583 | Targosh | Nov. 22, 1955 |